US008358697B2

(12) United States Patent
Han et al.

(10) Patent No.: US 8,358,697 B2
(45) Date of Patent: Jan. 22, 2013

(54) METHOD AND APPARATUS FOR ENCODING AND DECODING AN IMAGE USING A REFERENCE PICTURE

(75) Inventors: Woo-jin Han, Suwon-si (KR); Sang-rae Lee, Suwon-si (KR); Jung-hye Min, Yongin-si (KR); Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 12/395,731

(22) Filed: Mar. 2, 2009

(65) Prior Publication Data

US 2009/0285300 A1     Nov. 19, 2009

(30) Foreign Application Priority Data

May 16, 2008 (KR) .................. 10-2008-0045481

(51) Int. Cl.
*H04N 7/26* (2006.01)
*H04N 7/12* (2006.01)
*H04N 7/32* (2006.01)
*H04N 7/34* (2006.01)

(52) U.S. Cl. .......... 375/240.16; 375/240.12; 375/240.24

(58) Field of Classification Search ............. 375/240.16, 375/240.24
See application file for complete search history.

(56) References Cited

U.S. PATENT DOCUMENTS

| 5,699,476 A | 12/1997 | Van Der Meer |
| 2009/0003449 A1* | 1/2009 | Sekiguchi et al. ....... 375/240.16 |

FOREIGN PATENT DOCUMENTS

WO   WO 2009136692 A2 *  11/2009

OTHER PUBLICATIONS

Nicolas Tizon, Béatrice Pesquet-Popescu; "Scalable and media aware adaptive video streaming over wireless networks"; Jan. 2008; EURASIP Journal on Advances in Signal Processing, vol. 2008; Publisher: Hindawi Publishing Corp.; pp. 1-11.*

Heiko Schwarz, et al. "Analysis of Hierarchical B Pictures and MCTF", Fraunhofer Institute for Telecommunications—Heinrich Hertz Institute, Image Processing Department Einsteinufer 37, 10587 Berlin, Germany; 4 pages total, 2006.

* cited by examiner

*Primary Examiner* — Matthew Smithers
*Assistant Examiner* — Courtney Fields
(74) *Attorney, Agent, or Firm* — Sughrue Mion, PLLC (57) ABSTRACT

A method and apparatus for encoding and decoding an image by performing motion prediction and compensation on pictures in a group of pictures by selectively using a high-quality key picture that is previously encoded and restored, and a second picture that is previously encoded and restored. The method of encoding an image improves the prediction efficiency of an image by storing a key picture, which is encoded and restored to a high quality by reducing a loss caused by a quantization error using a small quantization coefficient, in a first storage unit and storing a previously encoded and restored second picture in a second storage unit, and then performing motion prediction and compensation by selectively using the key picture stored in the first storage unit and the second picture stored in the second storage unit while encoding a next picture in a group of pictures.

11 Claims, 7 Drawing Sheets

| FIRST STORAGE UNIT | I0 | | | | | | | | | | | | |
|---|---|---|---|---|---|---|---|---|---|---|---|---|---|
| SECOND STORAGE UNIT | | I0 | I0 | I0 | I0 | I0 | I0 | | | | | | |
| ENCODING TYPE | I0 | P1 | P2 | P3 | P4 | P5 | P6 | P7 | P8 | P9 | P10 | P11 | P12 |
| | | P1 | P2 | P3 | P4 | P5 | P6 | P7 | P8 | P9 | P10 | P11 | |
| | | | | | | | | | P8 | P8 | P8 | | |

GOP BOUNDARY

METHOD AND APPARATUS FOR ENCODING AND DECODING AN IMAGE USING A REFERENCE PICTURE

CROSS-REFERENCE TO RELATED PATENT APPLICATION

This application claims the benefit of Korean Patent Application No. 2008-0045481, filed on May 16, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to a method and apparatus for encoding and decoding an image, which can improve prediction efficiency of an image by performing motion prediction and compensation on pictures in a group of pictures by selectively using a high-quality key picture that is previously encoded and then restored, and using a previous picture that is previously encoded and then restored.

2. Description of the Related Art

During video encoding, compression is performed by removing spatial redundancy and temporal redundancy in an image sequence. In order to remove temporal redundancy, an area of a reference picture that is similar to an area of a currently encoded picture is searched for by using a picture located in front of or behind the currently encoded picture as the reference picture, a motion vector between the area of the currently encoded picture and the corresponding area of the reference picture is detected, and a residual between the currently encoded picture and a prediction picture obtained by performing a motion compensation process is encoded based on the detected motion vector.

According to the video standards, such as Motion Picture Experts Group-1 (MPEG-1), MPEG-2, MPEG-4, and H.264/AVC (advance video coding), each picture in an image sequence is classified into an I picture, a P picture, or a B picture according to a prediction encoding method. An I picture denotes a picture that is encoded by using only information in the picture without performing prediction encoding between pictures; a P picture denotes a picture that is prediction encoded by referring to one picture that is located in front of or behind the currently encoded picture and is already processed; and a B picture denotes a picture that is prediction encoded by referring to two pictures that are located in front of or behind the currently encoded picture and that are already processed.

Generally, each picture in an image sequence is classified into a group of pictures (GOP) formed of a predetermined number of pictures. According to a coding order, the first picture in each GOP is encoded as an I picture, and the remaining pictures in each GOP are encoded as a P picture or a B picture. For example, when a GOP is formed of 7 pictures, the pictures may be encoded as IPPPPPP or IBBPBBP. In case of the pictures encoded as IPPPPPP, the first I picture is intra prediction encoded by using only information in the I picture without referring to any other picture. The remaining P pictures are encoded by using a temporarily adjacent previous picture that is previously encoded and then restored. In case of the pictures encoded as IBBPBBP, the B pictures between the I picture and the P picture are bi-directional prediction encoded by using two reference pictures of the first I picture and the fourth P picture, and the B pictures between the fourth P picture and the seventh P picture are bi-directional encoded by using two reference pictures of the fourth P picture and the seventh P picture.

When the pictures in the GOP are encoded as IPPPPPP or IBBPBBP, the overall bit rate may be reduced since a correlation between temporally adjacent images can be high, but a predication error may accumulate, thereby reducing an overall peak signal to noise ratio (PSNR).

SUMMARY OF THE INVENTION

The present invention provides a method and apparatus for encoding and decoding an image, which can improve prediction efficiency of an image, by performing motion prediction and compensation by using not only a previously encoded and restored reference picture, but also a high-quality key picture as a reference picture, while encoding pictures in a group of pictures.

According to an aspect of the present invention, there is provided a method of encoding an image, the method comprising: encoding a first picture, restoring the first picture, and storing the first picture, from among pictures included in a group of pictures, in a first storage unit; prediction encoding a current picture by using the first picture stored in the first storage unit and a second picture previously encoded, restored, and stored in a second storage unit before the current picture is encoded; restoring the prediction-encoded current picture and storing the prediction-encoded current picture in the second storage unit ; and prediction encoding a next picture that is to be encoded after the current picture using the prediction-encoded current picture stored in the second storage unit.

According to another aspect of the present invention, there is provided an apparatus for encoding an image, comprising: a first storage unit which stores a first picture that is encoded and restored to a high quality, from among pictures included in a group of pictures; a second storage unit which stores a previously encoded and restored second picture before a current picture is encoded; a prediction encoding unit which performs prediction encoding on the pictures included in the group of pictures; and a restoring unit which restores the prediction-encoded pictures, wherein the prediction encoding unit prediction encodes the current picture by using at least one of the first picture stored in the first storage unit and the second picture stored in the second storage unit, and restores and stores the prediction-encoded current picture in the second storage unit, and wherein the prediction-encoded current picture stored in the second storage unit is used to prediction-encode a next picture that is to be encoded after the current picture.

According to another aspect of the present invention, there is provided a method of decoding an image, comprising: decoding a first picture from among pictures included in an encoded group of pictures in a bitstream and storing the first picture in a first storage unit; decoding a current picture by using at least one of the first picture stored in the first storage unit and a second picture of the group of pictures, which is previously decoded and stored in a second storage unit; storing the decoded current picture in the second storage unit; and decoding a next picture that is to be decoded after the current picture is decoded using the decoded current picture stored in the second storage unit.

According to another aspect of the present invention, there is provided an apparatus for decoding an image, comprising: a first storage unit which stores a decoded first picture from among pictures included in an encoded group of pictures in a bitstream; a second storage unit which stores a previously decoded second picture of a the group of pictures; and a decoder which decodes a current picture by using at least one of the decoded first picture and the decoded second picture, wherein the decoder stores the decoded current picture in the second storage unit, and wherein the decoded current picture is used to decode a next picture that is to be decoded after the current picture is decoded.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 1A:
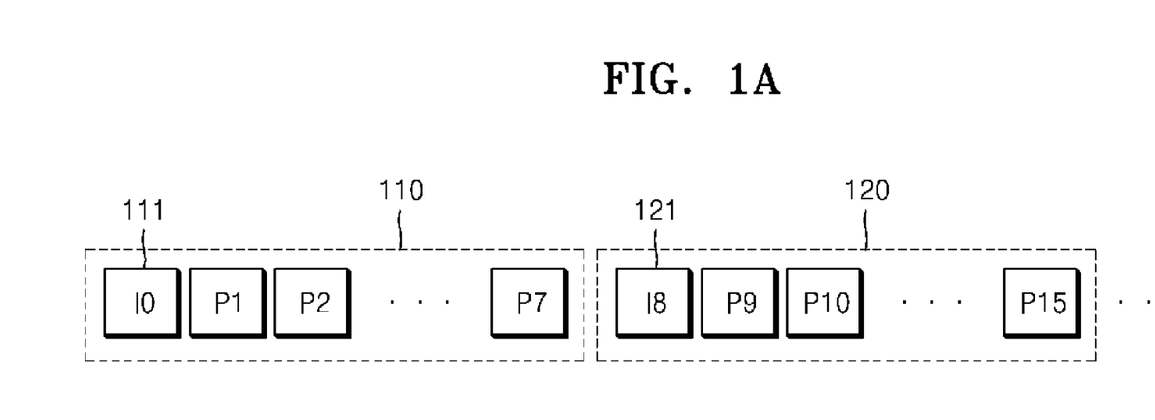
FIGS. 1A and 1B are diagrams illustrating a plurality of group of pictures (GOP) that are encoded according to a method and apparatus for encoding an image, according to exemplary embodiments of the present invention, respectively.
Figure 1B:
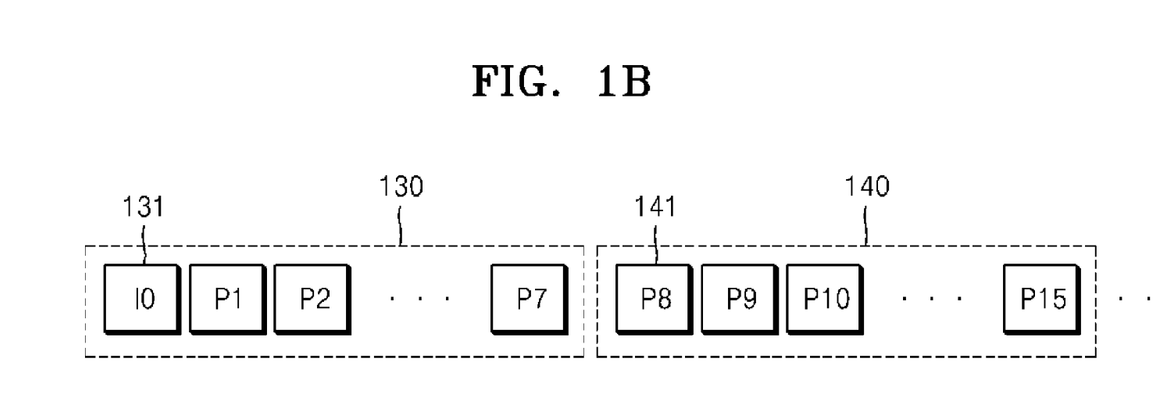

FIGS. 1A and 1B are diagrams illustrating groups of pictures (GOPs) 110 and 120 and groups of pictures (GOPs) 130 and 140 that are encoded according to a method and apparatus for encoding an image, according to exemplary embodiments of the present invention, respectively. In FIGS. 1A and 1B, Ia (a is an integer) denotes an I picture that is (a+1)-ly encoded in an entire image sequence, and Pb (b is an integer) denotes a P picture that is (b+1)-ly encoded in the entire image sequence.

For example, one GOP is formed of 8 pictures. The first pictures 111 and 121 of the GOPs 110 and 120, respectively, may be encoded as I pictures, and the remaining pictures in the GOPs 110 and 120, that are excluding the I pictures, may be encoded as P pictures P1-P7 and P9-P15 of the GOPs 110 and 120, respectively, as illustrated in FIG. 1A. Alternatively, a first picture 131 of the GOP 130, from among the GOPs 130 and 140, is encoded as an I picture. The first picture of GOP 140 after the GOP 130 may be encoded as a P picture instead of an I picture, as illustrated in FIG. 1B. For example, a first picture 141 of the GOP 140 in FIG. 1B is prediction encoded as a P picture by referring to the last picture P7 of the GOP 130. Other methods and apparatuses for encoding an image, as described below, can be applied to all the GOPs 110, 120, 130 and 140 illustrated in FIGS. 1A and 1B. Also, for convenience of description, a GOP is formed of an I picture and a P picture, but it is obvious to one of ordinary skill in the art that the present invention can also be applied to a GOP including a B picture.

Figure 2:
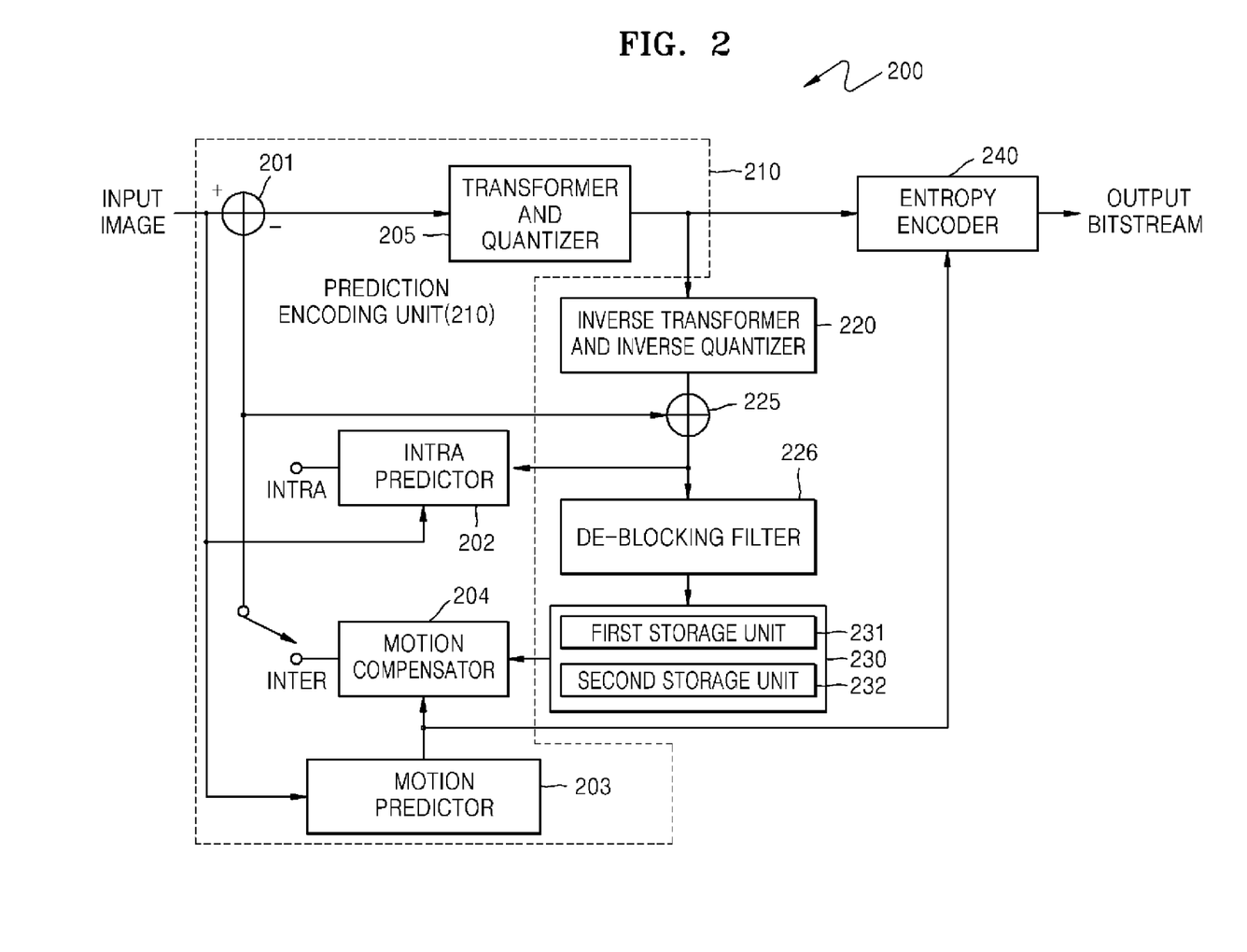
FIG. 2 is a block diagram of an apparatus for encoding an image, according to an exemplary embodiment of the present invention.

FIG. 2 is a block diagram of an apparatus 200 for encoding an image, according to an exemplary embodiment of the present invention. Referring to FIG. 2, the apparatus 200 includes a prediction encoding unit 210, an inverse transformer and inverse quantizer 220, an adder 225, a de-blocking filter 226, a storage unit 230, and an entropy encoder 240.

The prediction encoding unit 210 includes a subtracter 201, an intra predictor 202, a motion predictor 203, a motion compensator 204, and a transformer and quantizer 205. The prediction encoding unit 210 divides an input image into blocks having a predetermined size, and generates a prediction block by performing inter prediction or intra prediction on each block. In detail, the motion predictor 203 performs motion prediction, to generate a motion vector that indicates an area similar to a current block within a predetermined search range of a reference picture that is previously encoded and then restored. The motion compensator 204 performs motion compensation to generate a prediction block of the current block by obtaining data about a corresponding area of a reference picture indicated by the generated motion vector. Specifically, the motion predictor 203, according to the current embodiment of the present invention, generates a first prediction block and a second prediction block of a block in a current picture by performing motion prediction and compensation using at least one of a first picture stored in a first storage unit 231 and a second picture stored in a second storage unit 232. Thus, the motion predictor 203 determines a prediction block having a lower error value with respect to the current block as the final prediction block. Details thereof will be described later.

The intra predictor 202 performs intra prediction to generate a prediction block by using data about blocks adjacent to the current block.

The subtracter 201 generates a residual by subtracting the prediction block of the current block from the original image data. The transformer and quantizer 205 transforms the residual to a frequency area, and quantizes the transformed residual. The transformer and quantizer 205, according to the current exemplary embodiment of the present invention, encodes a key picture, i.e., a first picture in each GOP, to a high quality by quantizing the residual using a quantization coefficient smaller than a predetermined quantization coefficient. For example, when a value of the preset quantization coefficient is QP, the transformer and quantizer 205 quantizes blocks in the key picture by using a quantization coefficient having a value that is 2 steps or 4 steps lower than the QP, such as QP-2 or QP-4. Accordingly, more bits are assigned to the key picture, thereby encoding the key picture to a high quality.

The entropy encoder 240 generates a bitstream by performing variable length encoding on the quantized image data.

The inverse transformer and inverse quantizer 220 restores residual data by performing inverse quantization and inverse transformation on the transformed and quantized residual data. The adder 225 restores the current block by adding the restored residual data and prediction data. The restored current block is stored in the storage unit 230 via the de-blocking filter 226, so as to be used as reference data of a next block.

The storage unit 230 includes the first storage unit 231, which stores the first picture, i.e., the key picture, and the second storage unit 232, which stores the second picture, i.e., a previous picture that is previously encoded and then restored, excluding the first picture. The first picture stored in the first storage unit 231 is a key picture that is quantized by using a lower quantization coefficient and then restored as described above, and is the first picture in a GOP. Since the first picture is quantized by using the lower quantization coefficient and then restored, a loss caused by a quantization error is reduced, and thus a high-quality image can be obtained.

Figure 3A:
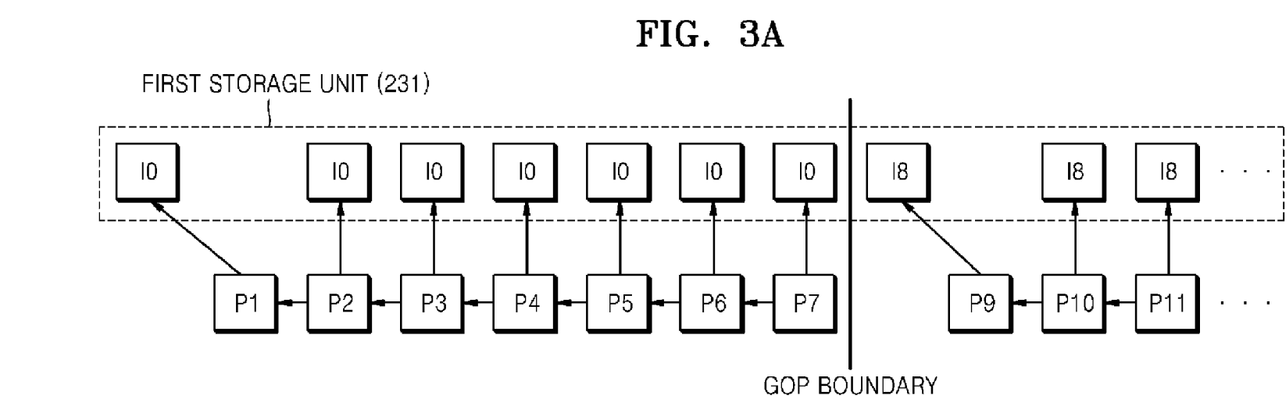
FIGS. 3A and 3B are diagrams for describing a first picture that is stored in a first storage unit while encoding image sequences of FIG. 1A and FIG. 1B, and a reference picture that is used during motion prediction and compensation of each picture in a group of picture.
Figure 3B:
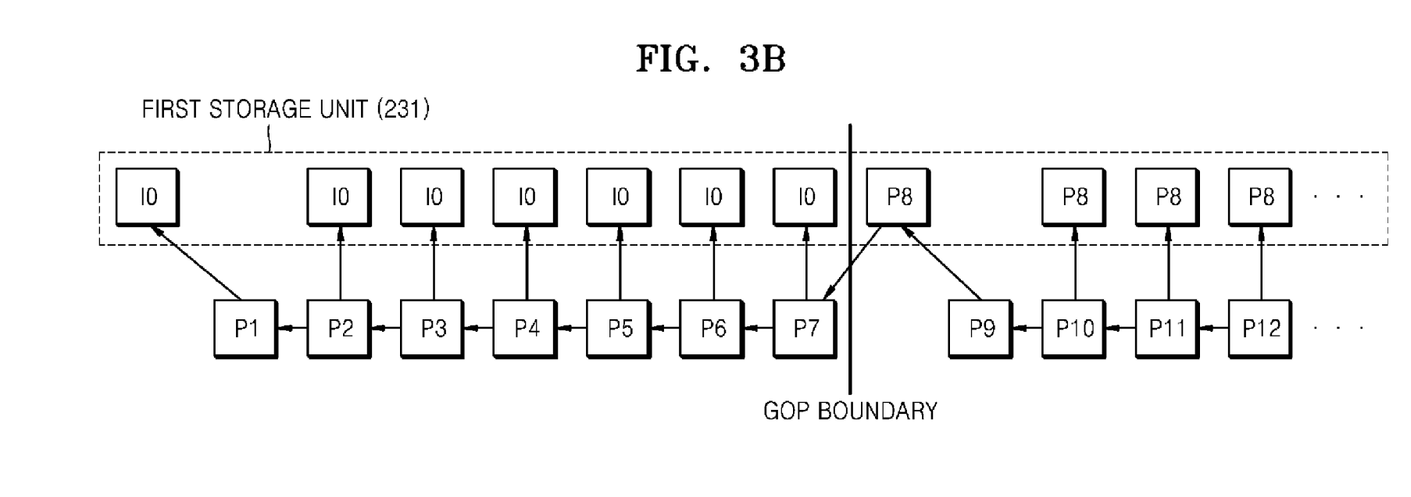

FIGS. 3A and 3B are diagrams for describing the first picture that is stored in the first storage unit 231 while encoding image sequences of FIG. 1A and FIG. 1B, and a reference picture that is used during motion prediction and compensation of each picture in a GOP.

Referring to FIG. 3A, while encoding an image sequence illustrated in FIG. 1A, an I picture (I0) of a first GOP is intra prediction encoded by using only information included in the I0 picture. That is to say, the I picture (I0) is intra predication encoded without using other reference pictures, and then the I picture is restored and stored in the first storage unit 231. Here, the I0 picture, i.e. a key picture, is restored after being quantized by using a lower quantization coefficient, and thus a loss caused by a quantization error is reduced to thereby obtain a high-quality key picture. A next P1 picture is prediction encoded by using the I0 picture stored in the first storage unit 231. The P1 picture, which is encoded via a transformation and quantization process, is restored via an inverse quantization and inverse transformation process, and the restored P1 picture is stored in the second storage unit 232. A next P2 picture is prediction encoded by using one of the I0 pictures stored in the first storage unit 231 and the P1 picture stored in the second storage unit 232. In detail, while prediction encoding the P2 picture, the motion predictor 203 and the motion compensator 204 divide the P2 picture into blocks having a predetermined size, generate a first prediction block by performing motion prediction and compensation on a current block to be encoded in the P2 picture within a predetermined search range of the I0 picture stored in the first storage unit 231, and generate a second prediction block by performing motion prediction and compensation on the current block within a predetermined search range of the P1 picture stored in the second storage unit 232. The motion predictor 203 and the motion compensator 204 determine and output a prediction block having a lower error value with respect to the current block, from among the first and second prediction blocks, as the final prediction block of the current block. A residual, i.e. a difference between the final prediction block and an input block, is encoded via a transformation and quantization process. Then the residual, which is restored via an inverse quantization and inverse transformation, is restored by being added to the final prediction block. The restored current block of the P2 picture is stored in the second storage unit 232. When such an encoding process is performed on all blocks of the P2 picture, the encoded and then restored P2 picture is stored in the second storage unit 232. Similarly, the remaining P pictures (P3 through P7 pictures) in the GOP are prediction encoded by using the I0 picture stored in the first storage unit 231, and a previous P picture that is previously encoded, and stored in the second storage unit 232.

Referring to FIG. 3B, while encoding an image sequence illustrated in FIG. 1B, a first picture of a GOP is not required to be encoded as an I picture, that is, excluding an I0 picture, i.e. a first picture of the image sequence. Accordingly, a key picture (P8 picture), i.e. a first picture of a second GOP, is prediction encoded by using the last picture (P7 picture) of the previous GOP, restored, and then stored in the first storage unit 231. Here, the P8 picture has a high quality since the P8 picture is quantized by using a lower quantization coefficient. The next P9 picture is prediction encoded by using the P8 picture stored in the first storage unit 231. The P9 picture, which is encoded via a transformation and quantization process, is restored via an inverse quantization and inverse transformation process, and the restored P9 picture is stored in the second storage unit 232. A next P10 picture is prediction encoded by using one of the P8 picture stored in the first storage unit 231 and the P9 picture stored in the second storage unit 232. In detail, the motion predictor 203 and the motion compensator 204 divide the P10 picture into blocks having a predetermined size, generate a first prediction block by performing motion prediction and compensation on a current block to be encoded in the P10 picture within a predetermined search range of the P8 picture stored in the first storage unit 231, and generate a second prediction block by performing motion prediction and compensation on the current block within a predetermined search range of the P9 picture stored in the second storage unit 232. The motion predictor 203 and the motion compensator 204 determine and output a prediction block having a smaller error value with respect to the current block, from among the first and second prediction blocks, as the final prediction block of the current block. Then, a residual, i.e. a difference between the final prediction block and an input block, is encoded via a transformation and quantization process, and the current block of the P10 picture is restored by adding the residual that is restored via an inverse quantization and inverse transformation, and the final prediction block. The restored current block of the P10 picture is stored in the second storage unit 232. When all blocks in the P10 picture are encoded, the encoded and then restored P10 picture is stored in the second storage unit 232. Encoding processes on the remaining pictures illustrated in FIG. 3B are identical to those for the pictures described with reference to FIG. 3A, except for the encoding process of the P8 picture, as described above. Thus, detailed descriptions thereof are omitted.

Figure 4:
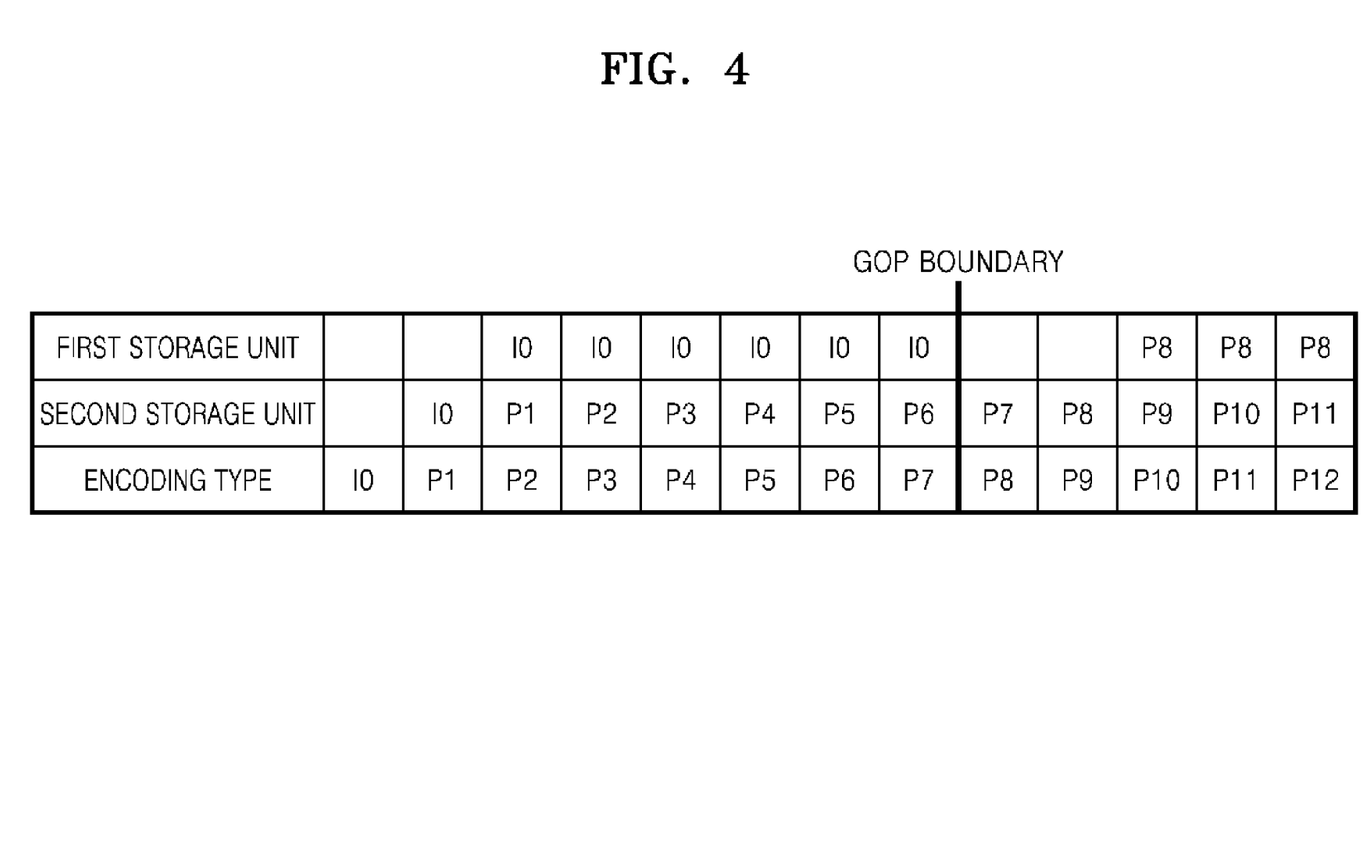
FIG. 4 is a diagram illustrating pictures stored in a first storage unit and a second storage unit of FIG. 2, while encoding each picture in the GOP illustrated in FIG. 1B.

FIG. 4 is a diagram illustrating pictures stored in the first storage unit 231 and the second storage unit 232 of FIG. 2, while encoding each picture in image sequences shown in FIG. 1B. In detail, FIG. 4 illustrates a first picture and a second picture respectively stored in the first storage unit 231 and the second storage unit 232 as reference pictures, when a picture in an encoding type is encoded. For example, in FIG. 4, when a P3 picture is encoded, an I0 picture is stored in the first storage unit 231 and a P2 picture is stored in the second storage unit 232. Here, the I0 picture and the P2 picture are pictures that are encoded and restored before the P3 picture.

Referring to FIG. 4, an I0 picture, i.e., a key picture of a first GOP is encoded, restored, and then stored in the second storage unit 232. According to the current exemplary embodiment present invention, a P picture is prediction encoded by using one of the first picture and the second picture respectively stored in the first storage unit 231 and the second storage unit 232. However, since only the I0 picture exists before a P1 picture, the P1 picture is encoded by performing motion prediction and compensation using the I0 picture that is encoded, restored, and then stored in the second storage unit 232. The I0 picture is stored in the second storage unit 232 when the P1 picture is encoded in FIG. 4, but the key picture, that is the I0 picture, may be directly stored in the first storage unit 231 without being stored in the second storage unit 232.

Then, when the P2 picture is encoded, the encoded and then restored I0 picture is stored in the first storage unit 231, and the P1 picture that is encoded and then restored before the P2 picture is stored in the second storage unit 232. As described above, when the P2 picture is encoded in a predetermined size block unit, the motion predictor 203 and the motion compensator 204 generate a first prediction block that is most similar to a current block of the P2 picture within a predetermined search range of the I0 picture stored in the first storage unit 231, and generate a second prediction block that is most similar to the current block of the P2 picture within a predetermined search range of the P1 picture stored in the second storage unit 232. Then, the motion predictor 203 and the motion compensator 204 determine a prediction block having the smallest error value with respect to the current block of the P2 picture, from among the first and second prediction blocks, as the final prediction block. The transformer and quantizer 205 encodes a residual, i.e. a difference between the final prediction block and the current block of the P2 picture, by transforming and quantizing the residual. The inverse transformer and inverse quantizer 220 restores the residual of the P2 picture by performing inverse quantization and inverse transformation, and the adder 225 restores the current block of the P2 picture by adding the restored residual and the final prediction block. When the P2 picture is restored by encoding and restoring all blocks of the P2 picture as described above, the restored P2 picture is stored in the second storage unit 232 so as to be used as a reference picture of the next P3 picture. Similarly, P3 through P7 pictures are prediction encoded via a motion prediction and compensation process by using the I0 picture, i.e. the key picture, stored in the first storage unit 231 and a previous picture that is encoded, restored, and then stored in the second storage unit 232.

When one GOP is completely encoded, the first and second storage units 231 and 232 are refreshed. In other words, when each GOP illustrated in FIG. 1A is encoded, the first and second storage units 231 and 232 are refreshed when all pictures in a GOP are completely encoded. However, when a first picture of a GOP is encoded by using the last picture of a previous GOP as illustrated in FIG. 1B, only the first storage unit 231 is restored, and the second storage unit 232 stores a previous picture that is encoded and then restored. In other words, as illustrated in FIG. 4, since the P8 picture, i.e. the key picture of the second GOP, is encoded by using the P7 picture of the first GOP, the P7 picture that is encoded and then restored is stored in the second storage unit 232 when the P8 picture is encoded. The processes of encoding the remaining pictures of the second GOP are identical to those of encoding pictures (I0 through P7 pictures) of the first GOP, except that the key picture is the P8 picture, instead of an I picture.

Meanwhile, if it is determined that the prediction block having the smaller error value with respect to the current block is the second prediction block, as the result of motion prediction and compensation, i.e. when it is determined that performing prediction encoding by using the second picture stored in the second storage unit 232 generates a smaller prediction error than the first picture stored in the first storage unit 231, the first picture may be updated by substituting an area of the first picture stored in the first storage unit 231 with the second prediction block, where the area of the first picture corresponds to the second prediction block.

Figure 5:
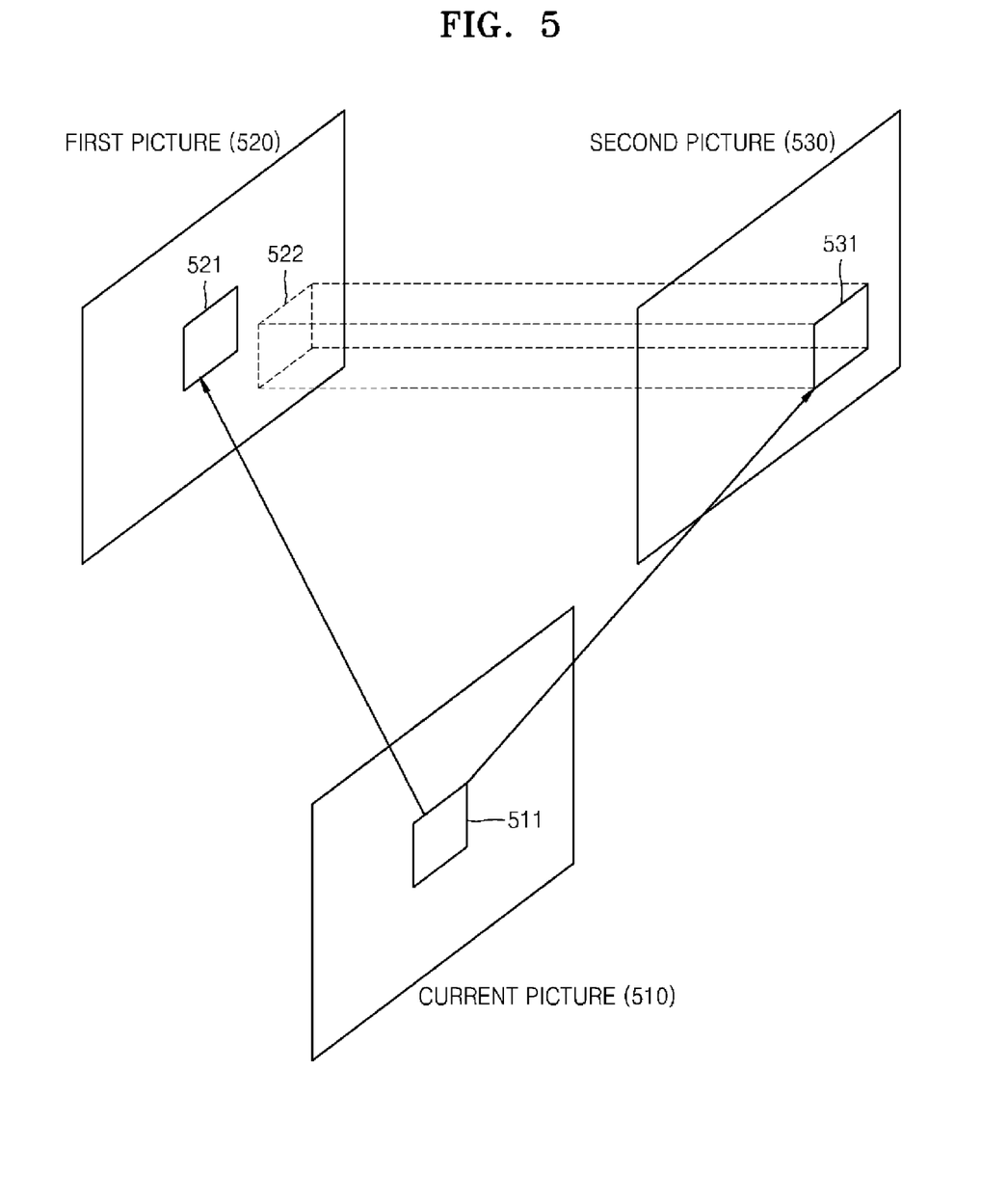
FIG. 5 is a diagram for describing a process of updating a first picture stored in the first storage unit of FIG. 2.
Figure 6:
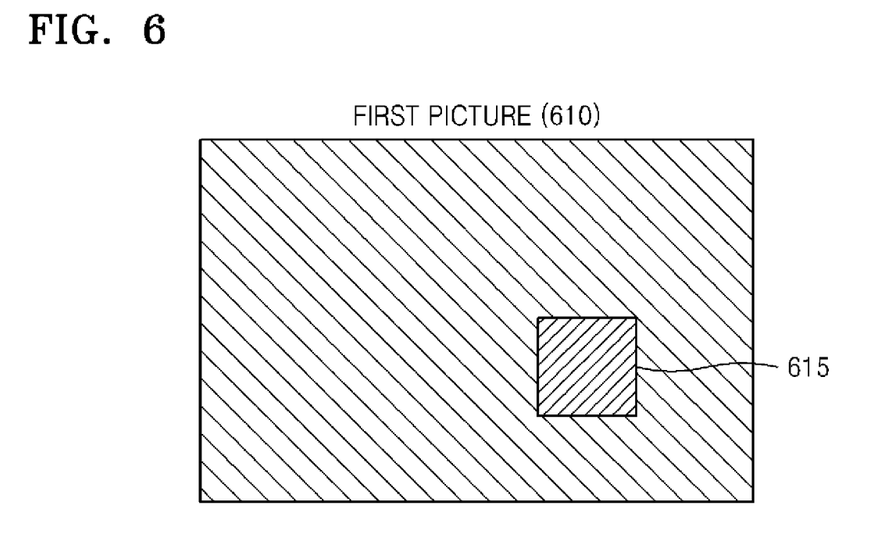
FIG. 6 is a diagram illustrating an example of an updated first picture according to an exemplary embodiment the present invention.

FIG. 5 is a diagram for describing a process of updating the first picture stored in the first storage unit 231 of FIG. 2. FIG. 6 is a diagram illustrating an example of an updated first picture according to an exemplary embodiment the present invention.

Referring to FIG. 5, when a current picture 510 is a P picture, the motion predictor 203 and the motion compensator 204 generate a first prediction block 521 from a first picture 520 stored in the first storage unit 231, and generate a second prediction block 531 from a second picture 530 stored in the second storage unit 232 by performing motion prediction and compensation on a current block 511 of the current picture 510 according to the present invention. Also, the motion predictor 203 and the motion compensator 204 determine a prediction block having a lower error value with respect to the current block 511, from among the first and second prediction blocks 521 and 531, as a final prediction block of the current block 511. Here, if the prediction block having the lower error value is determined to be the second prediction block 531, the first storage unit 231 updates the first picture 520 by substituting an area 522 of the first picture 520, which corresponds to the second prediction block 531 of the second picture 531, with the second prediction block 531. In other words, referring to FIG. 6, the first storage unit 231 updates a first picture 610 by substituting an area 615 of the first picture 610, which spatially corresponds to a second prediction block, with the second prediction block. A first picture is updated so that a newly appeared area that did not exist in a previous image frame due to a moving object in image frames is included in the first picture.

Figure 7:
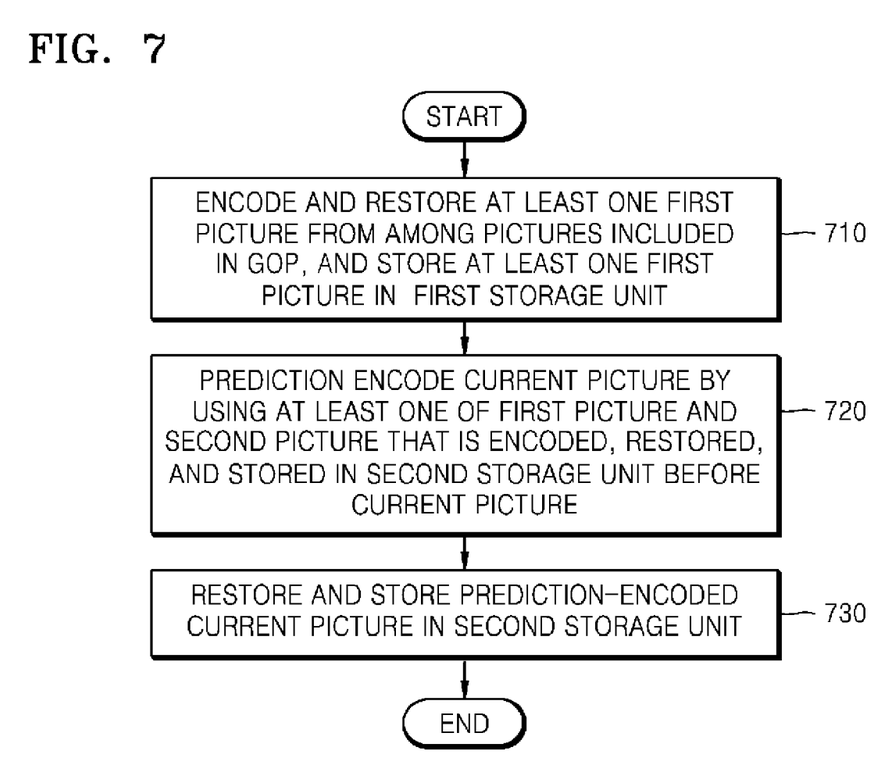
FIG. 7 is a flowchart of a method of encoding an image, according to an exemplary embodiment of the present invention.

FIG. 7 is a flowchart of a method of encoding an image, according to an exemplary embodiment of the present invention.

Referring to FIG. 7, at least one first picture, from among pictures included in one GOP, is encoded in a high quality, restored, and then stored in a first storage unit, in operation 710. The first picture is a key picture that is firstly encoded from among pictures in each GOP. When the present invention is applied to a hierarchical prediction structure, an I picture or a P picture used as a reference picture of a B picture in a GOP is the first picture. While encoding the first picture, the first picture is divided into blocks having a predetermined size, and a prediction block is generated by performing intra prediction or inter prediction on each block. A residual, i.e. an error value between the prediction block and an input block, is transformed and quantized. Here, the first picture is quantized by using a quantization coefficient lower than a predetermined quantization coefficient in order to prevent a quantization error and quality deterioration. The transformed and quantized residual is restored via an inverse quantization and inverse transformation process, and a block of the first picture is restored by adding the restored residual and the prediction block. If all blocks in the first picture are encoded and then restored, the restored first picture is stored in the first storage unit.

In operation 720, in order to encode the remaining pictures in the GOP, a current picture is prediction encoded by using at least one of the first picture stored in the first storage unit, and a second picture is encoded, restored, and then stored in a second storage unit before the current picture. As described above, a motion predictor and a motion compensator generate a first prediction block from the first picture stored in the first storage unit, generate a second prediction block from the second picture stored in the second storage unit, and determine a prediction block having a lower error value with respect to the current block, from among the first and second prediction blocks, as a final prediction block of the current block, by performing motion prediction and compensation on the current block of the current picture. If the prediction block having a lower error value with respect to the current block is determined to be the second prediction block, the first storage unit updates the first picture by substituting an area of the first picture, which corresponds to the second prediction block of the second picture, with the second prediction block.

In operation 730, the prediction-encoded current picture is restored and stored in the second storage unit so that the current picture is used as the second picture of a picture to be encoded after the current picture.

Figure 8:
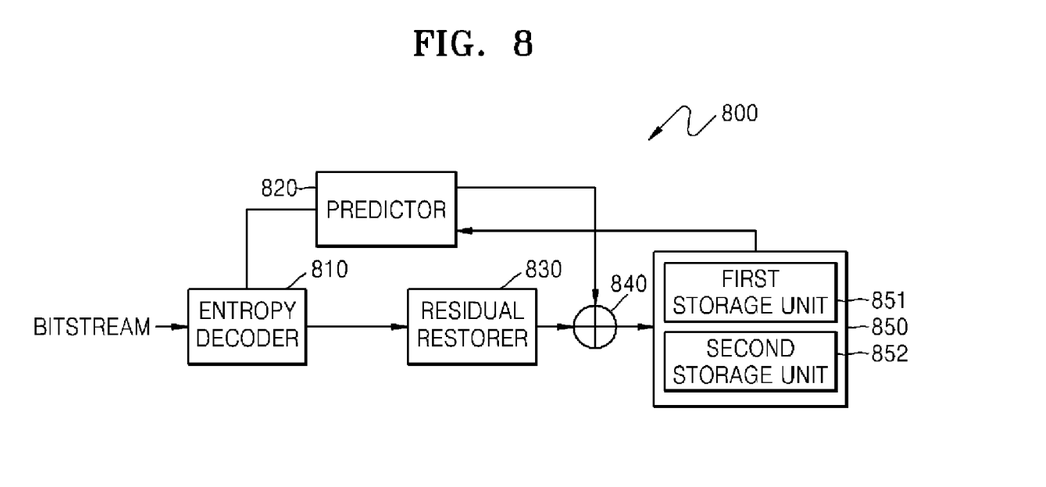
FIG. 8 is a block diagram of an apparatus for decoding an image, according to an exemplary embodiment of the present invention.

FIG. 8 is a block diagram of an apparatus 800 for decoding an image, according to an embodiment of the present invention.

Referring to FIG. 8, the apparatus 800 includes an entropy decoder 810, a predictor 820, a residual restorer 830, an adder 840, and a storage unit 850. The storage unit 850 includes a first storage unit 851, which stores a first picture, i.e. a key picture in each GOP, and a second storage unit 852, which stores a second picture, i.e. a previously decoded picture before a current picture.

The entropy encoder 810 extracts prediction mode information, reference picture information, and residual information of the current block to be decoded, from an input bitstream. The predictor 820 generates a prediction block of the current block by using the extracted prediction mode information and reference picture information. In detail, when a prediction mode of the current block is an inter prediction mode, the predictor 820 determines a reference picture from among the first picture stored in the first storage unit 851 and the second picture stored in the second storage unit 852 by using the reference picture information, and generates the prediction block of the current block by performing motion compensation using the determined reference picture. Here, the first picture is a key picture that is initially decoded from among pictures included in each GOP, and the second picture is a previous picture that is decoded before the current picture.

The residual restorer 830 restores a residual in the bitstream by performing inverse quantization and inverse transformation on the residual. The adder 840 decodes the current block by adding the restored residual and the prediction block of the current block. When the reference picture is the second picture, the first storage unit 851 may update the first picture by substituting an area of the first picture, which corresponds to the prediction block, with the prediction block.

Figure 9:
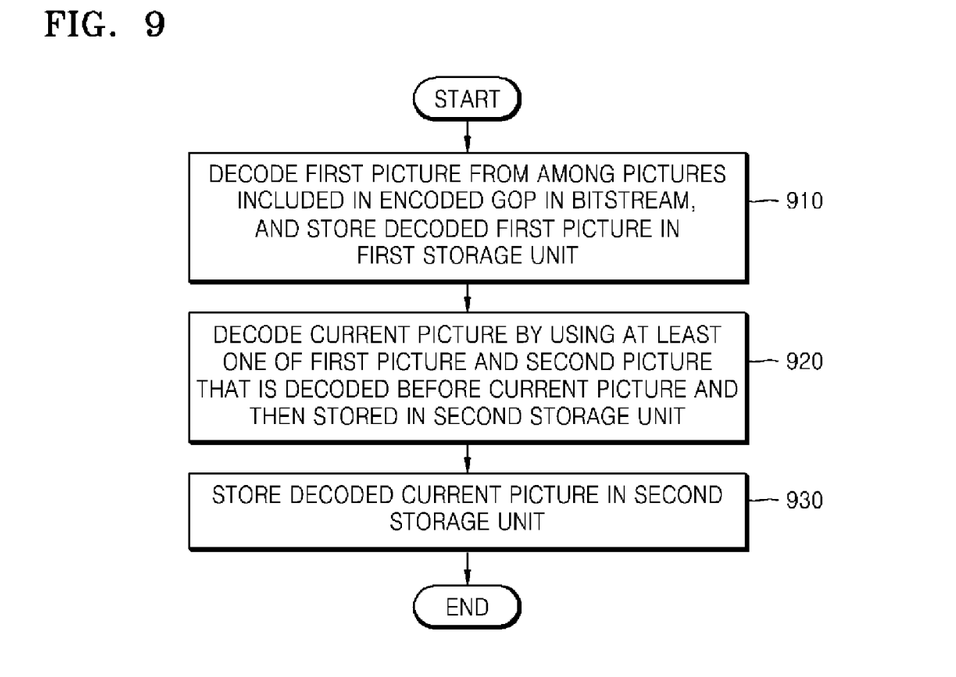
FIG. 9 is a flowchart of a method of decoding an image, according to an exemplary embodiment of the present invention.

FIG. 9 is a flowchart of a method of decoding an image, according to an exemplary embodiment of the present invention.

Referring to FIG. 9, a first picture having a high quality, from among pictures included in an encoded GOP in a bitstream, is decoded and then stored in a first storage unit, in operation 910. Here, the first picture denotes a key picture that is initially decoded from among the pictures included in each GOP, and a second picture denotes a previous picture that is decoded before a current picture.

In operation 920, at least one of the first picture and the second picture that is decoded and stored in a second storage unit before the current picture is determined as a reference picture of the current picture by using the reference picture information, and the current picture is decoded by performing motion compensation on each block of the current picture.

In operation 930, the decoded current picture is stored in the second storage unit so that the current picture is used as the second picture of a picture to be decoded after the current picture.

According to the method and apparatus for encoding an image of the present invention, prediction efficiency of a current picture is improved by using one of a key picture having a high quality and an adjacent previous picture that is previously encoded and then restored as a reference picture. Moreover, by improving the quality of the reference picture, the quality of images that are prediction encoded by using the reference picture also improves, and thus the compression performance of an image can be improved.

The invention can also be embodied as computer readable codes on a computer readable recording medium. The computer readable recording medium may be any data storage device that can store data, which can be thereafter read by a computer system. Examples of the computer readable recording medium include read-only memory (ROM), random-access memory (RAM), CD-ROMs, magnetic tapes, floppy disks, and optical data storage devices. In an alternative embodiment, the computer readable recording medium may be carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of encoding an image, the method comprising:
encoding a first picture, restoring the first picture, and storing the first picture, from among pictures included in a group of pictures, in a first storage unit;
prediction encoding a current picture by using one of the first picture that is initially encoded from among the pictures included in the group of pictures and stored in the first storage unit and a second picture previously encoded, restored, and stored in a second storage unit before the current picture is prediction encoded;
restoring the prediction-encoded current picture and storing the prediction-encoded current picture in the second storage unit; and
prediction encoding a next picture that is to be encoded after the current picture using the prediction-encoded current picture stored in the second storage unit,
wherein in the encoding, restoring, and storing the first picture comprises encoding the first picture by performing prediction encoding, transformation, and quantization on the first picture, and
wherein the first picture is quantized by using a quantization coefficient having a value smaller than a predetermined quantization coefficient to have a high quality.

2. The method of claim 1, wherein the prediction encoding of the current picture comprises:
generating, by performing motion prediction and compensation using the first picture, a first prediction block of a current block that is to be encoded in the current picture;
generating, by performing motion prediction and compensation using the second picture, a second prediction block of the current block;
determining a prediction block of the current block having a smallest error value from among the first and second prediction blocks, as a final prediction block of the current block; and
determining a difference between the final prediction block and the current block; and
transforming and quantizing the difference.

3. The method of claim 2, wherein the determining a prediction block of the current block comprises updating the first picture by substituting an area of the first picture stored in the first storage unit with the second prediction block, if it is determined that an error value between the second prediction block and the current block is smaller than an error value between the first prediction block and the current block, and
wherein the area corresponds to the second prediction block.

4. An apparatus for encoding an image, comprising:
a first storage unit which stores a first picture that is initially encoded and restored to a high quality, from among pictures included in a group of pictures;
a second storage unit which stores a previously encoded and restored second picture before a current picture is encoded;
a prediction encoding unit which performs prediction encoding on the pictures included in the group of pictures; and
a restoring unit which restores the prediction-encoded pictures,
wherein the prediction encoding unit prediction encodes the current picture by using at least one of the first picture stored in the first storage unit and the second picture stored in the second storage unit, and restores and stores the prediction-encoded current picture in the second storage unit, and
wherein the prediction-encoded current picture stored in the second storage unit is used to prediction encode a next picture that is to be encoded after the current picture, and
wherein the prediction encoding unit comprises:
a predictor which generates a prediction image of the first picture, the second picture, and the current picture;
a transformer which transforms a difference between the prediction image and an input image to generate a transformed image; and
a quantizer which quantizes the transformed image, and
wherein the quantizer quantizes the first picture to a high quality using a quantization coefficient having a value smaller than a predetermined quantization coefficient.

5. The apparatus of claim 4, wherein the prediction encoding unit generates, by performing motion prediction and compensation using the first picture, a first prediction block of a current block to be encoded in the current picture, generates, by performing motion prediction and compensation using the second picture, a second prediction block of the current block, determines a prediction block of the current block having a smallest error value from among the first and second prediction blocks, as a final prediction block of the current block, determines a difference between the final prediction block and the current block, and transforms and quantizes the difference.

6. The apparatus of claim 5, wherein the first storage unit updates the first picture by substituting an area of the first picture, which corresponds to the second prediction block, with the second prediction block, if it is determined that an error value between the second prediction block and the current block is smaller than an error value between the first prediction block and the current block.

7. A method of decoding an image, comprising:
decoding a first picture which is a key picture that is initially decoded from among pictures included in an encoded group of pictures in a bitstream and storing the first picture in a first storage unit;
decoding a current picture by using at least one of the first picture stored in the first storage unit and a second picture of the group of pictures, which is previously decoded and stored in a second storage unit;
storing the decoded current picture in the second storage unit; and
decoding a next picture that is to be decoded after the current picture is decoded using the decoded current picture stored in the second storage unit,
wherein in decoding and storing the first picture comprises decoding the first picture by performing inverse quantization, inverse transformation, and prediction decoding, and
wherein the first picture is inverse-quantized by using a quantization coefficient having a value smaller than a predetermined quantization coefficient to have a high quality.

8. The method of claim 7, wherein the decoding of the current picture comprises:
extracting reference picture information of a current block of the current picture to be decoded from the bitstream;
determining a reference picture from among the first and second pictures by using the reference picture information, and generating a prediction block of the current block by performing motion compensation using the determined reference picture; and
decoding the current block by adding a residual in the bitstream and the prediction block of the current block.

9. The method of claim 8, wherein the generating of the prediction block comprises updating the first picture by substituting an area of the first picture, which corresponds to the prediction block of the current block, with the prediction block, if the reference picture is the second picture.

10. An apparatus for decoding an image, comprising:
a first storage unit which stores a decoded first picture which is key picture that is initially decoded from among pictures included in an encoded group of pictures in a bitstream;
a second storage unit which stores a previously decoded second picture of the group of pictures; and
a decoder which decodes a current picture by using at least one of the decoded first picture and the decoded second picture,
wherein the decoder stores the decoded current picture in the second storage unit,
wherein the decoded current picture is used to decode a next picture that is to be decoded after the current picture is decoded, and
wherein the decoder comprises:
an entropy decoder which extracts reference picture information of a current block of the current picture to be decoded from the bitstream;
a predictor which determines a reference picture from among the first and second pictures by using the reference picture information, and generates a prediction block of the current block by performing motion compensation using the determined reference picture;
a residual restorer which restores a residual in the bitstream by inverse quantizing and inverse transforming the residual; and
an adder which decodes the current block by adding the restored residual and the prediction block of the current block,
wherein the residual restorer performs inverse-quantization on the first picture by using a quantization coefficient having a value smaller than a predetermined quantization coefficient to have a high quality.

11. The apparatus of claim 10, wherein the first storage unit updates the first picture by substituting an area of the first picture, which corresponds to the prediction block of the current block, with the prediction block, if the reference picture is the second picture.

* * * * *